United States Patent
Huang

(10) Patent No.: US 11,860,805 B2
(45) Date of Patent: Jan. 2, 2024

(54) TERMINAL DEVICE, ADAPTER, AND CHARGING METHOD

(71) Applicant: VIVO MOBILE COMMUNICATION CO., LTD., Guangdong (CN)

(72) Inventor: Yewei Huang, Dongguan (CN)

(73) Assignee: VIVO MOBILE COMMUNICATION CO., LTD., Dongguan (CN)

(*) Notice: Subject to any disclaimer, the term of this patent is extended or adjusted under 35 U.S.C. 154(b) by 445 days.

(21) Appl. No.: 17/352,908

(22) Filed: Jun. 21, 2021

(65) Prior Publication Data

US 2021/0314697 A1 Oct. 7, 2021

Related U.S. Application Data

(63) Continuation of application No. PCT/CN2019/121219, filed on Nov. 27, 2019.

(30) Foreign Application Priority Data

Dec. 25, 2018 (CN) .......................... 201811593365.4

(51) Int. Cl.
*G06F 13/00* (2006.01)
*G06F 13/38* (2006.01)
(Continued)

(52) U.S. Cl.
CPC ........ *G06F 13/382* (2013.01); *G06F 13/4068* (2013.01); *H01R 31/065* (2013.01);
(Continued)

(58) Field of Classification Search
CPC .. G06F 13/382; G06F 13/4068; G06F 13/385; G06F 2213/0042;
(Continued)

(56) References Cited

U.S. PATENT DOCUMENTS 10,579,119 B2 * 3/2020 Lambert ............. G06F 13/4282
10,949,374 B2 * 3/2021 Yin ..................... G06F 13/4077
(Continued)

FOREIGN PATENT DOCUMENTS

CN 205544514 U * 8/2016
CN 106058553 A * 10/2016 ............. H01R 13/46
(Continued)

OTHER PUBLICATIONS

International Search Report and Written Opinion of the International Searching Authority regarding International Patent Application No. PCT/CN2019/121219, dated Feb. 28, 2020. Translation provided by Bohui Intellectual Property.
(Continued)

*Primary Examiner* — Naum Levin
(74) *Attorney, Agent, or Firm* — Harness, Dickey & Pierce, P.L.C.

(57) ABSTRACT

The present disclosure provides a terminal device includes: a first Type-C interface the first Type-C interface includes a first group of pins and a second group of pins. In a case where grounding impedance value of the first group of pins is within a preset range, a controller controls the first switch unit to connect the first group of pins to the application processor earphone interface, and controls the second switch unit to connect the second group of pins to the application processor fast charge interface; or in a case where the grounding impedance value of the second group of pins is within the preset range, the controller controls the second switch unit to connect the second group of pins to the application processor earphone interface, and controls the first switch unit to connect the first group of pins to the application processor fast charge interface.

12 Claims, 3 Drawing Sheets

(51) Int. Cl.
*G06F 13/40* (2006.01)
*H01R 31/06* (2006.01)
*H02J 7/00* (2006.01)
*H04R 1/10* (2006.01)

(52) U.S. Cl.
CPC .......... *H02J 7/0045* (2013.01); *H04R 1/1025* (2013.01); *H04R 1/1041* (2013.01); *G06F 2213/0042* (2013.01); *G06F 2213/3806* (2013.01); *H02J 2207/30* (2020.01); *H04R 2420/09* (2013.01)

(58) Field of Classification Search
CPC .......... G06F 2213/3806; H01R 31/065; H02J 7/0045; H02J 7/00032; H02J 2207/30; H04R 1/1025; H04R 1/1041; H04R 2420/09
See application file for complete search history.

(56) References Cited

U.S. PATENT DOCUMENTS

| | | | |
|---|---|---|---|
| 11,526,459 B2 * | 12/2022 | Jiang | H01R 13/66 |
| 2018/0145469 A1 * | 5/2018 | Chung | H01R 31/065 |
| 2018/0205237 A1 * | 7/2018 | Kuo | H02J 7/342 |
| 2019/0286593 A1 * | 9/2019 | Li | H04R 1/1033 |
| 2020/0014161 A1 * | 1/2020 | Liao | H05K 5/0052 |
| 2020/0133908 A1 | 4/2020 | Yin | |
| 2021/0109878 A1 | 4/2021 | Jiang | |

FOREIGN PATENT DOCUMENTS

| | | | | |
|---|---|---|---|---|
| CN | 107172515 A | | 9/2017 | |
| CN | 107204645 A | * | 9/2017 | ............ H02J 7/0047 |
| CN | 107205189 A | * | 9/2017 | ........... H04R 1/1041 |
| CN | 206758786 U | | 12/2017 | |
| CN | 207530591 U | * | 6/2018 | |
| CN | 108271093 A | * | 7/2018 | ......... G06F 13/4068 |
| CN | 108666826 A | | 10/2018 | |
| CN | 108810701 A | * | 11/2018 | ........... H04R 1/1091 |
| CN | 208272318 U | * | 12/2018 | |
| CN | 109862457 A | | 6/2019 | |
| WO | WO-2018149224 A1 | | 8/2018 | |
| WO | WO-2018176901 A1 | * | 10/2018 | ........... G06F 13/382 |

OTHER PUBLICATIONS

First Office Action regarding Chinese Patent Application No. 201811593365.4, dated Oct. 9, 2019. Translation provided by Bohui Intellectual Property.
Second Office Action regarding Chinese Patent Application No. 201811593365.4, dated Mar. 23, 2020. Translation provided by Bohui Intellectual Property.
Third Office Action regarding Chinese Patent Application No. 201811593365.4, dated Jul. 22, 2020. Translation provided by Bohui Intellectual Property.
Supplementary European Search Report regarding Patent Application No. 19904790.3-1202/3905714; PCT/CN2019/121219, dated Jan. 18, 2022.
"Universal Serial Bus Type-C Cable and Connector Specification," Revision 1.2, USB 3.0 Promoter Group: Hewlett-Packard, et al., dated Mar. 25, 2016.

* cited by examiner

TERMINAL DEVICE, ADAPTER, AND CHARGING METHOD

CROSS-REFERENCE TO RELATED APPLICATIONS

This application is a Bypass Continuation Application of PCT/CN2019/121219 filed on Nov. 27, 2019, which claims priority to Chinese Patent Application No. 201811593365.4 filed in China on Dec. 25, 2018, which are incorporated herein by reference in their entirety.

TECHNICAL FIELD

The embodiments of the present disclosure relate to the field of communications technologies, and in particular, to a terminal device, an adapter, and a charging method.

BACKGROUND

Type-C interfaces of mobile terminals have gradually become popular. At the same time, the removal of 3.5 mm interfaces has become a trend. A Type-C interface needs to output digital audio and analog audio, and also needs to meet the charging needs. The way to output digital audio is that a digital-to-analog conversion chip and an earphone power amplifier chip are placed on an earphone, where the earphone is called a digital earphone, or a Type-C interface to a 3.5 mm interface adapter cable is used, a digital-to-analog conversion chip and an earphone power amplifier chip are placed on the adapter cable, and the 3.5 mm interface can be connected to a 3.5 mm analog earphone. The digital earphone completely occupies the Type-C interface and charging cannot be performed, and earphones popular on the market mostly use the 3.5 mm interface.

SUMMARY

According to a first aspect, an embodiment of the present disclosure provides a terminal device, including:
- a first Type-C interface, where the first Type-C interface includes: a first group of pins and a second group of pins;
- a first switch unit, where the first group of pins are connected to an application processor earphone interface or an application processor fast charge interface of the terminal device through the first switch unit;
- a second switch unit, where the second group of pins are connected to the application processor earphone interface or the application processor fast charge interface of the terminal device through the second switch unit;
- and a controller, where when the grounding impedance value of the first group of pins is within a preset range, the controller controls the first switch unit to connect the first group of pins to the application processor earphone interface, and controls the second switch unit to connect the second group of pins to the application processor fast charge interface;
- or when the grounding impedance value of the second group of pins is within the preset range, controls the second switch unit to connect the second group of pins to the application processor earphone interface, and controls the first switch unit to connect the first group of pins to the application processor fast charge interface.

According to a second aspect, an embodiment of the present disclosure further provides an adapter, including:
- a second Type-C interface, where the second Type-C interface includes an earphone pin and a data transmission pin; and
- an earphone interface and a Type-C charging interface that are connected to the second Type-C interface, where the earphone pin is connected to the earphone interface, and the data transmission pin is connected to the Type-C charging interface;
- where the earphone pin is connected to the first group of pins of the terminal device, and the data transmission pin is connected to the second group of pins of the terminal device;
- or the earphone pin is connected to the second group of pins of the terminal device, and the data transmission pin is connected to the first group of pins of the terminal device.

According to a third aspect, an embodiment of the present disclosure further provides a charging method, applied to the foregoing terminal device. The charging method includes:
- detecting a grounding impedance value of a target pin, to obtain a detection result, where the target pin includes a first group of pins and/or a second group of pins; and
- when the detection result is that the grounding impedance value of the first group of pins is within a preset range, controlling the first group of pins to connect to the application processor earphone interface of the terminal device, and controlling the second group of pins to connect to the application processor fast charge interface of the terminal device;
- or when the detection result is that the grounding impedance value of the second group of pins is within the preset range, controlling the second group of pins to connect to the application processor earphone interface, and controlling the first group of pins to connect to the application processor fast charge interface.

BRIEF DESCRIPTION OF DRAWINGS

To describe the technical solutions in the embodiments of the present disclosure more clearly, the following briefly describes the accompanying drawings required in the embodiments of the present disclosure. Apparently, the accompanying drawings in the following descriptions show merely some embodiments of the present disclosure, and a person of ordinary skill in the art may still derive other drawings from these accompanying drawings.

DETAILED DESCRIPTION OF EMBODIMENTS

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure shall fall within the protection scope of the present disclosure.

When there is only Type-C interface and there is no 3.5 mm earphone interface, performing charging and earphone functions simultaneously requires a one-to-two adapter. This solution is ordinary charging and the charging speed is slow. Various fast charging methods commonly used need to occupy D+ and D− pins of the interface, and an audio output left channel L pin and an audio output right channel R pin of the earphone are generally used as these two pins. As a result, when the earphone function is used, the fast charge mode cannot be used, which affects user experience.

On the mobile terminal in the related technology and the one-to-two adapter (switching between charging and earphone functions), a DP pin and a DN pin are occupied by an L pin and an R pin respectively. As a result, when the earphone is used, only ordinary voltage bus (VBUS) charging can be used and the fast charging mode cannot be used, and charging cannot be controlled, affecting security.

Figure 1:
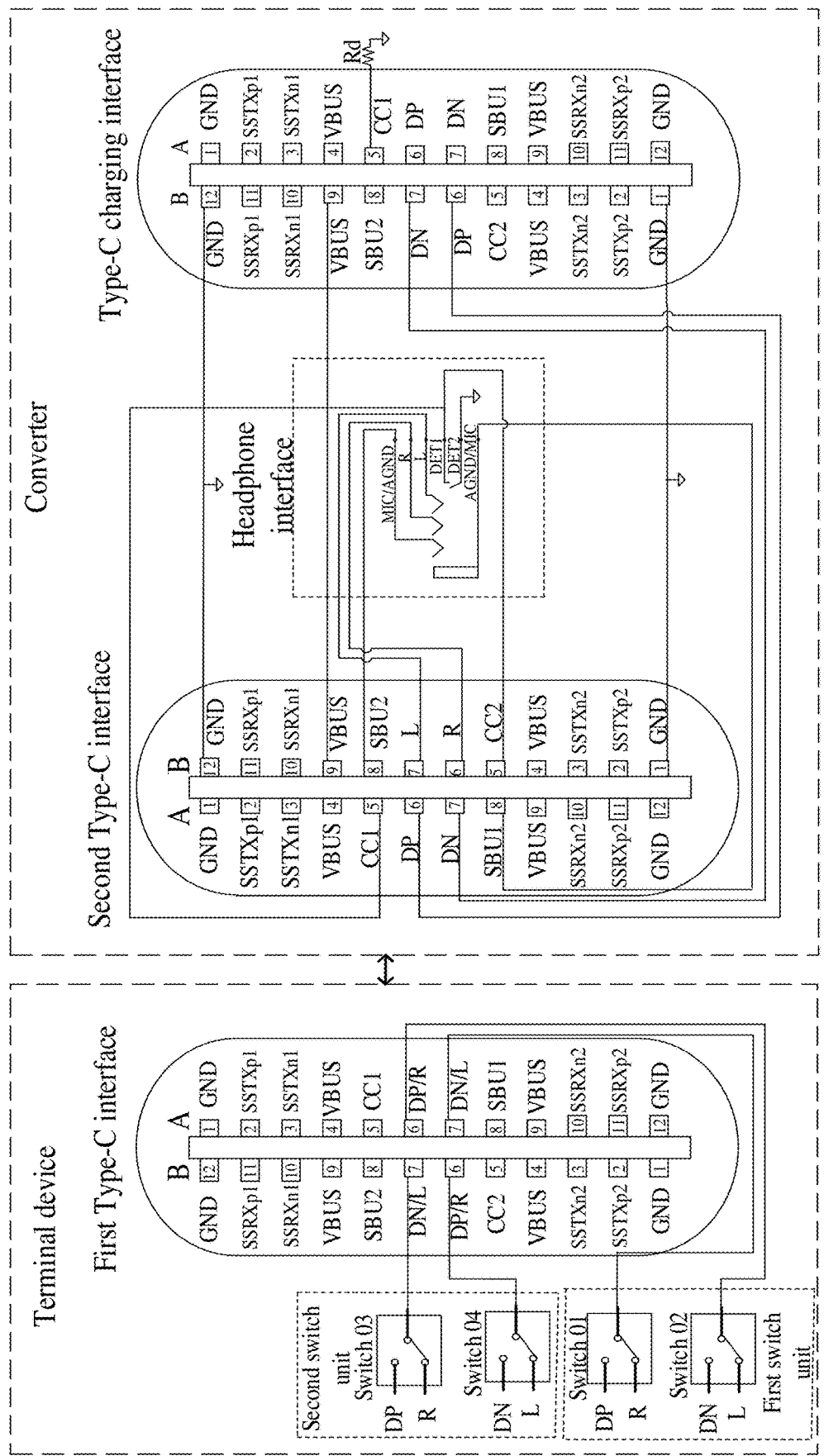
FIG. 1 is a schematic structural diagram of a terminal device and an adapter according to an embodiment of the present disclosure.

On this basis, an embodiment of the present disclosure provides a terminal device. As shown in FIG. 1, the terminal device includes: a first Type-C interface, a first switch unit, a second switch unit, and a controller.

Figure 2:
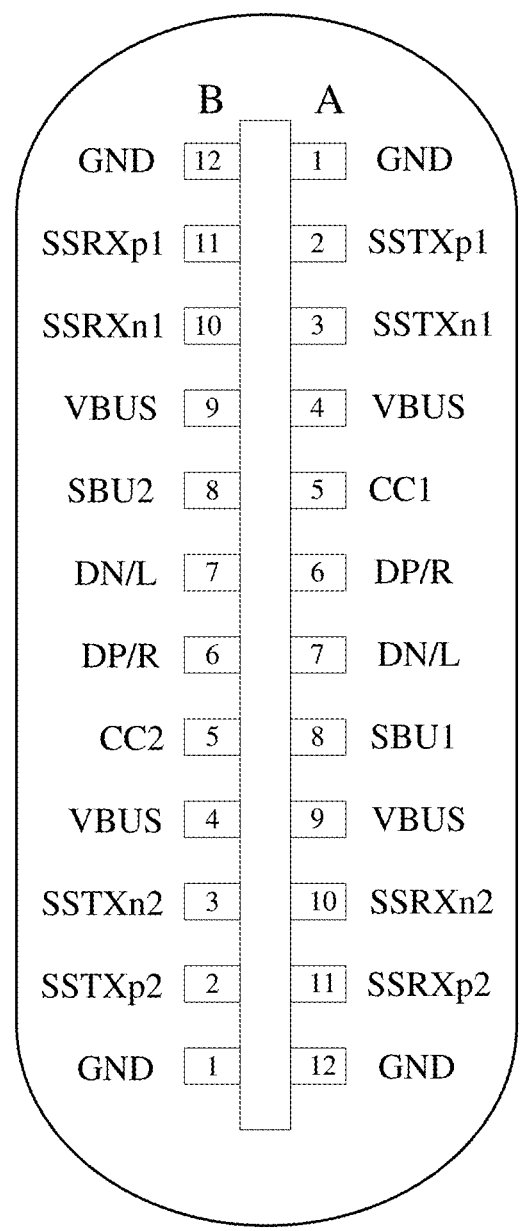
FIG. 2 is a schematic structural diagram of a first Type-C interface of a terminal device according to an embodiment of this disclosure.

The first Type-C interface is connected to a converter, and as shown in FIG. 2, the first Type-C interface includes: a first group of pins and a second group of pins. The first group of pins may be connected to the earphone interface or the Type-C charging interface of the converter, and the second group of pins may be connected to the Type-C charging interface or the earphone interface of the converter. When the first group of pins are connected to the earphone interface of the converter, the second group of pins are connected to the Type-C charging interface of the converter. When the first group of pins are connected to the Type-C charging interface of the converter, the second group of pins are connected to the earphone interface of the converter.

The first group of pins include a first pin and a second pin, the second group of pins include a third pin and a fourth pin; where the first pin is used as a first earphone pin and a first data transmission pin of the first Type-C interface, and the second pin is used as a second earphone pin and a second data transmission pin of the first Type-C interface. The third pin is used as a first earphone pin and a first data transmission pin of the first Type-C interface, and the fourth pin is used as a second earphone pin and a second data transmission pin of the first Type-C interface.

For example, the first group of pins are A6 and A7 pins of the first Type-C interface, and the second group of pins are B6 and B7 pins of the first Type-C interface. Certainly, the first group of pins may also be B6 and B7 pins, and the second group of pins may also be A6 and A7 pins.

A6 is the first pin, B6 is the third pin, and A6 and B6 are both used as the first earphone pin and the first data transmission pin of the first Type-C interface and may be DP/R pin. A7 is the second pin, B7 is the fourth pin, and A7 and B7 are both used as the second earphone pin and the second data transmission pin of the first Type-C interface and may be DN/L pin. That is, the first earphone pin (Rpin) is used as the first data transmission pin (DPpin), and the second earphone pin (Lpin) is used as the second data transmission pin (DNpin). When the first Type-C interface shown in FIG. 2 is plugged into a digital earphone, A6, A7, B6, and B7 pins output digital audio signals. When the first Type-C interface shown in FIG. 2 is plugged into a universal serial bus (USB) charger, A6, A7, B6, and B7 pins transmit USB signals and enter the fast charging mode. The earphone interface is a 3.5 mm earphone interface.

The first group of pins are connected to an application processor earphone interface or an application processor fast charge interface of the terminal device through the first switch unit.

The second group of pins are connected to the application processor earphone interface or the application processor fast charge interface of the terminal device through the second switch unit.

The application processor earphone interface includes an R pin and an L pin. The application processor fast charging interface can be used for fast charging through related fast charging protocols.

When the grounding impedance value of the first group of pins is within a preset range, the controller determines that the first group of pins are connected to the earphone interface of the converter, controls the first switch unit to connect the first group of pins to the application processor earphone interface, and controls the second switch unit to connect the second group of pins to the application processor fast charge interface;

or when the grounding impedance value of the second group of pins is within the preset range, determines that the second group of pins are connected to the earphone interface of the converter, controls the second switch unit to connect the second group of pins to the application processor earphone interface, and controls the first switch unit to connect the first group of pins to the application processor fast charge interface.

Herein, when the grounding impedance value of the first group of pins is within a preset range, the controller determines that the first group of pins are used as the earphone interface, controls the first switch unit to connect the first group of pins to the application processor earphone interface, determines that the second group of pins are used as the data transmission interface, and controls the second switch unit to connect the second group of pins to the application processor fast charge interface.

When the grounding impedance value of the second group of pins is within the preset range, the controller determines that the second group of pins are used as the earphone interface, controls the second switch unit to connect the second group of pins to the application processor earphone interface, determines that the first group of pins are used as the data transmission interface, and controls the first switch unit to connect the first group of pins to the application processor fast charge interface.

When connecting the first group of pins to the application processor fast charge interface, a master control unit (MCU) can perform fast charging according to the fast charge protocol, and when connecting the second group of pins to the application processor fast charge interface, a main control unit MCU can perform fast charging according to the fast charging protocol. The controller can be a control module of an application processor (AP).

For the terminal device of the embodiments of the present disclosure, a group of pins in the first group of pins and the second group of pins are first determined as the earphone pin, and then the remaining group of pins are used as the charging pin, so that the earphone function and the fast charging function can be implemented at the same time.

According to the embodiments of the present disclosure, the controller controls one of the first switch unit and the second switch unit to connect to the application processor earphone interface according to the grounding impedance values of the first group of pins or the second group of pins, and controls the remaining switch unit to connect to the application processor fast charge interface, so that users can also perform fast charging in fast charge mode while using the earphone function.

According to the terminal device of the embodiments of the present disclosure, the controller controls one of the first switch unit and the second switch unit to connect to the application processor earphone interface according to the grounding impedance values of the first group of pins or the second group of pins, and the remaining switch unit may connect to the application processor fast charge interface, so that users can also perform fast charging in fast charge mode while using the earphone function.

Optionally, the first switch unit includes a first switching switch and a second switching switch.

The second switch unit includes a third switching switch and a fourth switching switch.

The first switching switch (switch 01) is respectively connected to the second pin (A7 pin) of the first group of pins and the first earphone pin (R pin) of the application processor earphone interface, or the first switching switch is respectively connected to the second pin (A7 pin) of the first group of pins and the first data transmission pin (DP pin) of the application processor fast charge interface.

The second switching switch (switch 02) is respectively connected to the first pin (A6 pin) of the first group of pins and the second earphone pin (L pin) of the application processor earphone interface, or the second switching switch is respectively connected to the first pin (A6 pin) of the first group of pins and the second data transmission pin (DN pin) of the application processor fast charge interface.

The third switching switch (switch 03) is respectively connected to the fourth pin (B7 pin) of the second group of pins and the first earphone pin (R pin) of the application processor earphone interface, or the third switching switch is respectively connected to the fourth pin (B7 pin) of the second group of pins and the first data transmission pin (DP pin) of the application processor fast charge interface.

The fourth switching switch (switch 04) is respectively connected to the third pin (B6 pin) of the second group of pins and the second earphone pin (L pin) of the application processor earphone interface, or the fourth switching switch is respectively connected to the third pin (B6 pin) of the second group of pins and the second data transmission pin (DN pin) of the application processor fast charge interface.

Optionally, the first switching switch, the second switching switch, the third switching switch, and the fourth switching switch are all single-pole double-throw switches;

a non-movable port of the first switching switch is connected to the second pin of the first group of pins, and a movable port of the first switching switch is connected to the first earphone pin of the application processor earphone interface or the first data transmission pin of the application processor fast charge interface;

a non-movable port of the second switching switch is connected to the first pin of the first group of pins, and a movable port of the second switching switch is connected to the second earphone pin of the application processor earphone interface or the second data transmission pin of the application processor fast charge interface;

a non-movable port of the third switching switch is connected to the fourth pin of the second group of pins, and a movable port of the third switching switch is connected to the first earphone pin of the application processor earphone interface or the first data transmission pin of the application processor fast charge interface; and a non-movable port of the fourth switching switch is connected to the third pin of the second group of pins, and a movable port of the fourth switching switch is connected to the second earphone pin of the application processor earphone interface or the second data transmission pin of the application processor fast charge interface.

In the terminal device of the embodiments of the present disclosure, A6 pin and B7 pin of the first Type-C interface are separated and are connected to different switch units, and A7 pin and B6 pin are separated and are connected to different switch units. Correspondingly, in the adapter, DP pin and R pin are separated and DN pin and L pin are separated. A6 and A7 are DP pin and DN pin respectively, and B6 and B7 are R pin and L pin respectively. A6 pin and A7 pin of the adapter are connected to A6 pin and A7 pin of a Type-C female socket (Type-C charging interface) of a one-to-two adapter cable (can also be connected to B6 pin and B7 pin of the female socket), and B6 and B7 of the one-to-two adapter are connected to R pin and L pin of the 3.5 mm earphone socket (earphone interface).

In the embodiments of the present disclosure, after the 3.5 mm analog earphone and the charger are inserted into the terminal device through the adapter, CC1 pin and CC2 pin of the first Type-C interface are short-circuited to the ground. The mobile terminal detects through CC1 pin and CC2 pin to determine whether a slave device is an analog earphone. For example, if voltages of CC1 pin and CC2 pin are less than a preset voltage threshold, it is determined that the slave device is an analog earphone device. Grounding impedances of A6 pin, A7 pin, B6 pin, and B7 pin are detected, and if the grounding impedances are within the preset range, it is determined that it is the earphone type. For example, if it is detected that grounding impedances of A6 and A7 pins are within the preset range, it is determined that it is the earphone type, and the switch is controlled to switch to a corresponding channel, that is, A6 and A7 pins are connected to the application processor earphone interface of the terminal device. If the impedances of B6 and B7 pins are outside the preset range, it is determined that it is the USB type, and the switch is controlled to switch to a corresponding channel, that is, B6 and B7 pins are connected to the application processor fast charge interface, and an earphone type channel is switched to earphone output and a USB type channel is switched to a USB channel. The charger performs VBUS charging on the mobile terminal. After the mobile terminal detects the VBUS charging, the mobile terminal starts fast charging protocol charging to perform fast charging and earphone functions.

As shown in FIG. 1, an embodiment of the present disclosure further provides an adapter, including:

a second Type-C interface, and an earphone interface and a Type-C charging interface that are connected to the second Type-C interface.

The earphone interface may be a 3.5 mm earphone interface, and the earphone is connected through the earphone interface. The Type-C charging interface is used to connect to the charger, and fast charging can be achieved through the Type-C charging interface.

The earphone pin is connected to the earphone interface, the data transmission pin is connected to the Type-C charging interface, the second Type-C interface is connected to the terminal device, and the second Type-C interface includes the earphone pin and the data transmission pin.

The earphone pin is connected to the first group of pins of the terminal device, and the data transmission pin is connected to the second group of pins of the terminal device;

or the earphone pin is connected to the second group of pins of the terminal device, and the data transmission pin is connected to the first group of pins of the terminal device.

Optionally, the earphone pin includes: a first earphone pin (R pin) and a second earphone pin (L pin), and the data transmission pin includes a first data transmission pin (DP pin) and a second data transmission pin (DN pin). The second Type-C interface may be a Type-C male socket used to connect to the terminal device, and the first Type-C interface may be a Type-C female socket that is connected to the adapter.

The first group of pins may be A6 and A7 pins of the first Type-C interface of the terminal device, and the second group of pins may be B6 and B7 pins of the first Type-C interface. Certainly, the first group of pins can also be B6 and B7 pins of the first Type-C interface, and the second group of pins are A6 and A7 pins of the first Type-C interface.

The first earphone pin and the second earphone pin are connected to two pins of the first group of pins in a one-to-one correspondence, and the first data transmission pin and the second data transmission pin are connected to two pins of the second group of pins in a one-to-one correspondence. Alternatively, the first earphone pin and the second earphone pin are connected to two pins of the second group of pins in a one-to-one correspondence, and the first data transmission pin and the second data transmission pin are connected to two pins of the first group of pins in a one-to-one correspondence.

Optionally, R pin is connected to R pin, L pin is connected to L pin, DP pin is connected to DP pin, and DN pin is connected to DN pin.

In the adapter of the embodiments of the present disclosure, the first data transmission pin (DP pin) and the first earphone pin (R pin) of the second Type-C interface are separated, and the second data transmission pin (DN pin) and the first earphone pin (L pin) are separated. DP and DN pins are connected to the Type-C charging interface, and R pin and L pin are connected to the earphone interface. Correspondingly, A6 pin and B7 pin of the first Type-C interface of the terminal device are separated and are connected to different switch units, and A7 pin and B6 pin are separated and are connected to different switch units, so that the terminal device can achieve the fast charging function and the earphone function at the same time.

Optionally, the Type-C charging interface includes: a first data transmission pin and a second data transmission pin.

The first data transmission pin of the Type-C charging interface is connected to the first data transmission pin of the second Type-C interface.

The second data transmission pin of the Type-C charging interface is connected to the second data transmission pin of the second Type-C interface.

The first earphone pin of the earphone interface is connected to the first earphone pin of the second Type-C interface.

The second earphone pin of the earphone interface is connected to the second earphone pin of the second Type-C interface.

As shown in FIG. 1, DP pin of the Type-C charging interface is connected to DP pin of the second Type-C interface, DN pin of the Type-C charging interface is connected to DN pin of the second Type-C interface, R pin of the earphone interface is connected to R pin of the second Type-C interface, and L pin of the earphone interface is connected to L pin of the second Type-C interface.

In the embodiments of the present disclosure, DP pin and R pin of the second Type-C interface of the adapter are separated, and DN and L pin are separated. A6 and A7 pins of the adapter are DP and DN pins respectively, and B6 and B7 pins are R and L pins respectively. A6 and A7 pins of the adapter are connected to A6 and A7 pins of the Type-C female socket (Type-C charging interface) of the one-to-two adapter cable (can also be connected to B6 and B7 pins of the female socket), and B6 and B7 of the one-to-two adapter are connected to R and L pins of the 3.5 mm earphone socket (earphone interface).

Figure 3:
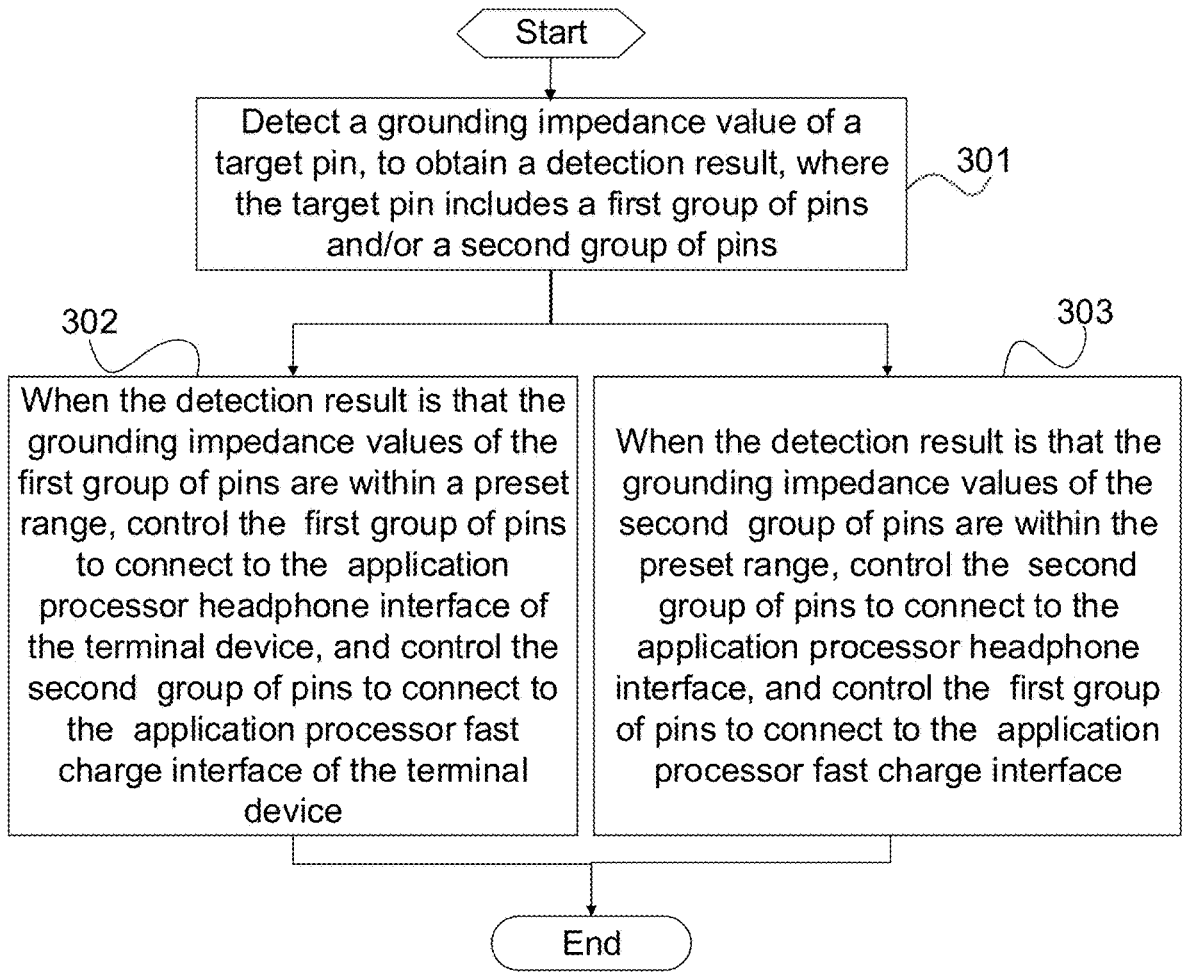
FIG. 3 is a schematic flowchart of a charging method according to an embodiment of the present disclosure.

An embodiment of the present disclosure further provides a charging method, applied to the foregoing terminal device. As shown in FIG. 3, the charging method includes:

Step 301: Detect a grounding impedance value of a target pin, to obtain a detection result, where the target pin includes a first group of pins and/or a second group of pins.

In the embodiments of the present disclosure, the terminal device is connected to the adapter, and this step may include: detecting whether an external device connected to the adapter is an earphone device; and when the external device connected to the adapter is an earphone device, detecting a grounding impedance value of a target pin, to obtain a detection result, where the target pin includes a first group of pins and/or a second group of pins.

Figure 4:
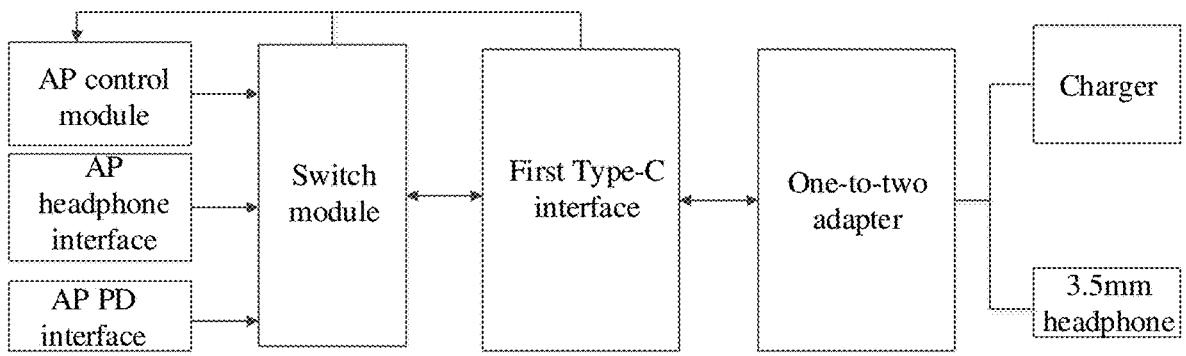
FIG. 4 is a schematic diagram of connection of a terminal device, an adapter, a charger, and an earphone according to an embodiment of the present disclosure.

As shown in FIG. 4, in the embodiments of the present disclosure, the terminal device includes an application processor AP control module, an AP earphone interface (including R pin and L pin), an AP USB interface (including DP pin and DN pin), a switch module (a first switch unit and a second switch unit), and a first Type-C interface. The first Type-C interface is connected to a one-to-two adapter, and the one-to-two adapter is connected to a charger and a 3.5 mm earphone.

The AP control module is responsible for detecting CC logic, determining an inserted device, and controlling switching of a state of the switch module, or the like.

The AP earphone interface outputs an analog earphone signal and is usually a codec.

The AP USB interface is a transmission charging protocol interface.

The switch module is responsible for switching between left and right channel output and a USB port of the earphone.

Optionally, the AP control module pulls CC1 pin and CC2 pin to ground. After pulling CC1 pin and CC2 pin to ground, the resistance is less than Ra and is generally 1.2K. If voltages of CC1 pin and CC2 pin are less than a preset voltage threshold, it is determined that the external device is the earphone device; otherwise, it is determined that the external device is another device.

Step 302: When the detection result is that the grounding impedance value of the first group of pins is within a preset range, control the first group of pins to connect to the application processor earphone interface of the terminal device, and control the second group of pins to connect to the application processor fast charge interface of the terminal device.

Optionally, the first switch unit is controlled to connect the first group of pins to the application processor earphone interface, and the second switch unit is controlled to connect the second group of pins to the application processor fast charge interface.

Step 303: When the detection result is that the grounding impedance value of the second group of pins is within the preset range, control the second group of pins to connect to the application processor earphone interface, and control the first group of pins to connect to the application processor fast charge interface.

Optionally, the second switch unit is controlled to connect the second group of pins to the application processor earphone interface, and the first switch unit is controlled to connect the first group of pins to the application processor fast charge interface.

The foregoing step 302 and step 303 are in parallel.

In the technical solutions of the embodiments of the present disclosure, by changing the peripheral circuit structure of the Type-C interface of the mobile terminal, adding electronic switches, separating a Type-C earphone (L/R) channel and a USB (DP/DN) channel, and designing reasonable system logic, users can achieve the fast charging function and the earphone function at the same time after inserting a related device.

In the charging method of the embodiments of the present disclosure, it is detected whether the external device connected to the adapter is an earphone device; when the external device is an earphone device, a grounding impedance value of a target pin is detected, to obtain a detection result, where the target pin includes a first group of pins and/or a second group of pins. When the detection result is that the grounding impedance value of the first group of pins is within a preset range, it is determined that the first group of pins are connected to the earphone interface of the converter, the first group of pins are controlled to connect to the application processor earphone interface of the terminal device, and the second group of pins are controlled to connect to the application processor fast charge interface of the terminal device; or when the detection result is that the grounding impedance value of the second group of pins is within the preset range, it is determined that the second group of pins are connected to the earphone interface of the converter, the second group of pins are controlled to connect to the application processor earphone interface, and the first group of pins are controlled to connect to the application processor fast charge interface. In this way, users can also perform fast charging in fast charging mode while using the earphone function.

The terminal device in the embodiments of this disclosure includes a device formed by components such as a radio frequency unit, a network module, an audio output unit, an input unit, a sensor, a display unit, a user input unit, an interface unit, a memory, a processor, and a power supply.

The embodiments in this specification are described in a progressive manner. Each embodiment focuses on a difference from another embodiment. For a same or similar part of the embodiments, refer to each other.

Although some optional embodiments in the embodiments of this disclosure have been described, persons skilled in the art can make changes and modifications to these embodiments once they learn the basic inventive concept. Therefore, the following claims are intended to be construed as to cover optional embodiments and all changes and modifications falling within the scope of the embodiments of this disclosure.

Finally, it should be noted that in this specification, relationship terms such as "first" and "second" are merely used to distinguish one entity or operation from another, and do not necessarily require or imply that any actual relationship or sequence exists between these entities or operations. Moreover, the terms "include", "comprise", or their any other variants are intended to cover a non-exclusive inclusion, so that a process, a method, an article, or a terminal device that includes a list of elements not only includes those elements but also includes other elements that are not listed, or further includes elements inherent to such a process, method, article, or terminal device. Without being subject to further limitations, an element defined by a phrase "including" does not exclude presence of other identical elements in the process, method, article, or terminal device that includes the very element.

The foregoing descriptions are merely optional embodiments of this disclosure, but are not intended to limit this disclosure. Any modification, equivalent replacement, or improvement made without departing from the spirit and principle of this disclosure shall fall within the protection scope of this disclosure.

What is claimed is:

1. A terminal device, comprising:
   a first Type-C interface, wherein the first Type-C interface comprises: a first group of pins and a second group of pins;
   a first switch unit, wherein the first group of pins are connected to an application processor earphone interface or an application processor fast charge interface of the terminal device through the first switch unit;
   a second switch unit, wherein the second group of pins are connected to the application processor earphone interface or the application processor fast charge interface of the terminal device through the second switch unit; and
   a controller, wherein in a case where grounding impedance value of the first group of pins is within a preset range, the controller controls the first switch unit to connect the first group of pins to the application processor earphone interface, and controls the second switch unit to connect the second group of pins to the application processor fast charge interface; or
   in a case where grounding impedance value of the second group of pins is within the preset range, controls the second switch unit to connect the second group of pins to the application processor earphone interface, and controls the first switch unit to connect the first group of pins to the application processor fast charge interface.

2. The terminal device according to claim 1, wherein the first group of pins comprise a first pin and a second pin, and the second group of pins comprise a third pin and a fourth pin;
   wherein the first pin is used as a first earphone pin and a first data transmission pin of the first Type-C interface, and the second pin is used as a second earphone pin and a second data transmission pin of the first Type-C interface; and
   the third pin is used as a first earphone pin and a first data transmission pin of the first Type-C interface, and the fourth pin is used as a second earphone pin and a second data transmission pin of the first Type-C interface.

3. The terminal device according to claim 2, wherein
   the first switch unit comprises a first switching switch and a second switching switch;
   the second switch unit comprises a third switching switch and a fourth switching switch;
   wherein the first switching switch is respectively connected to the second pin and a first earphone pin of the application processor earphone interface, or the first switching switch is respectively connected to the second pin and a first data transmission pin of the application processor fast charge interface;

the second switching switch is respectively connected to the first pin and a second earphone pin of the application processor earphone interface, or the second switching switch is respectively connected to the first pin and a second data transmission pin of the application processor fast charge interface;

the third switching switch is respectively connected to the fourth pin and the first earphone pin of the application processor earphone interface, or the third switching switch is respectively connected to the fourth pin and the first data transmission pin of the application processor fast charge interface; and the fourth switching switch is respectively connected to the third pin and the second earphone pin of the application processor earphone interface, or the fourth switching switch is respectively connected to the third pin and the second data transmission pin of the application processor fast charge interface.

4. The terminal device according to claim 3, wherein the first switching switch, the second switching switch, the third switching switch, and the fourth switching switch are all single-pole double-throw switches;

a non-movable port of the first switching switch is connected to the second pin, and a movable port of the first switching switch is connected to the first earphone pin of the application processor earphone interface or the first data transmission pin of the application processor fast charge interface;

a non-movable port of the second switching switch is connected to the first pin, and a movable port of the second switching switch is connected to the second earphone pin of the application processor earphone interface or the second data transmission pin of the application processor fast charge interface;

a non-movable port of the third switching switch is connected to the fourth pin, and a movable port of the third switching switch is connected to the first earphone pin of the application processor earphone interface or the first data transmission pin of the application processor fast charge interface; and a non-movable port of the fourth switching switch is connected to the third pin, and a movable port of the fourth switching switch is connected to the second earphone pin of the application processor earphone interface or the second data transmission pin of the application processor fast charge interface.

5. An adapter, comprising:

a second Type-C interface, wherein the second Type-C interface comprises an earphone pin and a data transmission pin; and an earphone interface and a Type-C charging interface that are connected to the second Type-C interface, wherein the earphone pin is connected to the earphone interface, and the data transmission pin is connected to the Type-C charging interface;

wherein the earphone pin is connected to the first group of pins of a terminal device, and the data transmission pin is connected to the second group of pins of the terminal device; or the earphone pin is connected to the second group of pins of the terminal device, and the data transmission pin is connected to the first group of pins of the terminal device.

6. The adapter according to claim 5, wherein the earphone pin comprises: a first earphone pin and a second earphone pin, and the data transmission pin comprises a first data transmission pin and a second data transmission pin.

7. The adapter according to claim 6, wherein the first earphone pin and the second earphone pin are connected to two pins of the first group of pins in a one-to-one correspondence, and the first data transmission pin and the second data transmission pin are connected to two pins of the second group of pins in a one-to-one correspondence.

8. The adapter according to claim 6, wherein the first earphone pin and the second earphone pin are connected to two pins of the second group of pins in a one-to-one correspondence, and the first data transmission pin and the second data transmission pin are connected to two pins of the first group of pins in a one-to-one correspondence.

9. The adapter according to claim 6, wherein the first data transmission pin of the Type-C charging interface is connected to the first data transmission pin of the second Type-C interface; and the second data transmission pin of the Type-C charging interface is connected to the second data transmission pin of the second Type-C interface.

10. The adapter according to claim 6, wherein the first earphone pin of the earphone interface is connected to the first earphone pin of the second Type-C interface; and the second earphone pin of the earphone interface is connected to the second earphone pin of the second Type-C interface.

11. A charging method, applied to a terminal device, wherein the terminal device comprises: a first Type-C interface, wherein the first Type-C interface comprises: a first group of pins and a second group of pins;

a first switch unit, wherein the first group of pins are connected to an application processor earphone interface or an application processor fast charge interface of the terminal device through the first switch unit;

a second switch unit, wherein the second group of pins are connected to the application processor earphone interface or the application processor fast charge interface of the terminal device through the second switch unit; and a controller, wherein in a case where grounding impedance value of the first group of pins is within a preset range, the controller controls the first switch unit to connect the first group of pins to the application processor earphone interface, and controls the second switch unit to connect the second group of pins to the application processor fast charge interface; or in a case where grounding impedance value of the second group of pins is within the preset range, controls the second switch unit to connect the second group of pins to the application processor earphone interface, and controls the first switch unit to connect the first group of pins to the application processor fast charge interface; and the method comprises:

detecting a grounding impedance value of a target pin, to obtain a detection result, wherein the target pin comprises a first group of pins and/or a second group of pins; and in a case where the detection result is that the grounding impedance value of the first group of pins is within a preset range, controlling the first group of pins to connect to the application processor earphone interface of the terminal device, and controlling the second group of pins to connect to the application processor fast charge interface of the terminal device;

or in a case where the detection result is that the grounding impedance value of the second group of pins is within the preset range, controlling the second group of pins to connect to the application processor earphone interface, and controlling the first group of pins to connect to the application processor fast charge interface.

12. The charging method according to claim 11, wherein the controlling the first group of pins to connect to the application processor earphone interface of the terminal device, and controlling the second group of pins to connect to the application processor fast charge interface of the terminal device comprises:
controlling the first switch unit to connect the first group of pins to the application processor earphone interface, and controlling the second switch unit to connect the second group of pins to the application processor fast charge interface; and
the controlling the second group of pins to connect to the application processor earphone interface, and controlling the first group of pins to connect to the application processor fast charge interface comprises:
controlling the second switch unit to connect the second group of pins to the application processor earphone interface, and controlling the first switch unit to connect the first group of pins to the application processor fast charge interface.

* * * * *